April 7, 1942.     W. C. WAGNER     2,278,682
COMPENSATED METER
Filed Aug. 22, 1939     5 Sheets-Sheet 1

WITNESS:
Robt. R. Kitchel

INVENTOR
Walter C. Wagner
BY Augustus B. Stoughton
ATTORNEY.

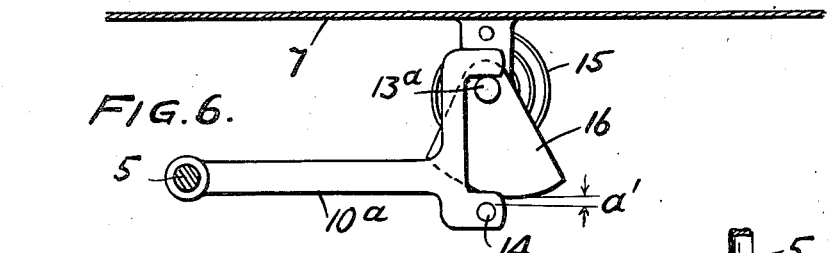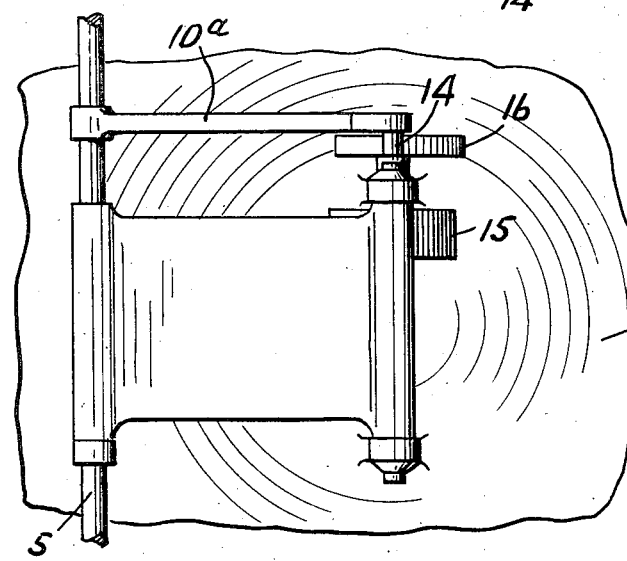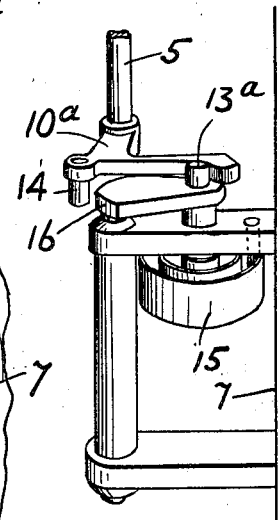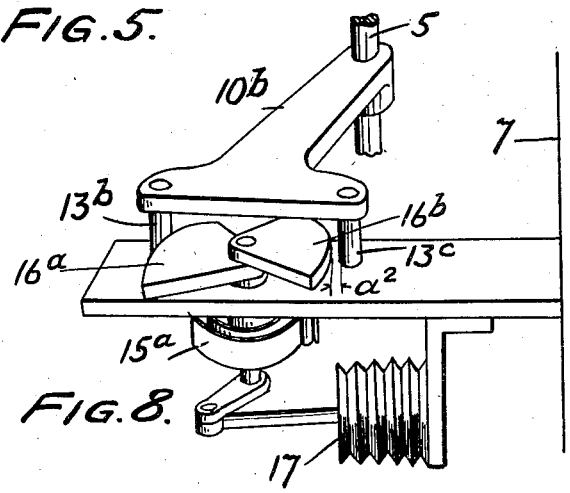

April 7, 1942.  W. C. WAGNER  2,278,682
COMPENSATED METER
Filed Aug. 22, 1939   5 Sheets-Sheet 5

WITNESS:

INVENTOR
Walter C. Wagner
BY
Augustus B. Stoughton
ATTORNEY.

Patented Apr. 7, 1942

2,278,682

UNITED STATES PATENT OFFICE 2,278,682

COMPENSATED METER

Walter C. Wagner, Ardmore, Pa.

Application August 22, 1939, Serial No. 291,301

4 Claims. (Cl. 73—268)

The present invention is a continuation in part of my application Ser. No. 70,135, filed March 21, 1936, now Patent No. 2,177,085.

The present invention relates to gas meters which are compensated for changes in the physical condition, temperature and pressure, of the gas.

In a standard meter equipped with features of my invention the travel or stroke of the bellows during inflation and deflation may be greater or less than in a standard meter, depending upon the limits of travel imposed by an element responsive to the physical condition of the gas. The valve gear and the registering mechanism are directly connected to the flag rods and operate as they do in the standard uncompensated meter, but there is a dwell in the operation of the flag rod while the bellows move a short distance, the extent of which depends upon the physical condition, pressure and/or temperature, of the gas.

One object of the present invention is to accurately compensate a standard, bellows-type gas meter, such as are in practically universal use for changes in the physical condition of the gas and thereby to improve it as an instrument of precision.

Other objects of the invention will appear from the following description at the end of which the invention will be claimed.

Generally stated, the invention consists in the interposition of a slot and pin mechanism as a lost motion device between the bellows plate and the flag rod arm, permitting the bellows plate to travel freely in a fixed path and the flag rod arm to oscillate freely in a circular path.

The invention also consists in the interposition and direct connection of an element responsive to the physical condition, temperature and/or pressure of the gas between the bellows plate and the flag rod of the meter.

The invention also comprises the improvements to be presently described and finally claimed.

In the following description reference will be made to the accompanying drawings forming part hereof and in which, Figure 1 is an elevational view of a portion of a standard gas meter with the front cover removed and showing the invention in application thereto.

Figures 5, 6 and 7 are similar views illustrating a modification of the invention.

Figure 8 is a perspective view illustrating another modification of the invention.

Figure 15:
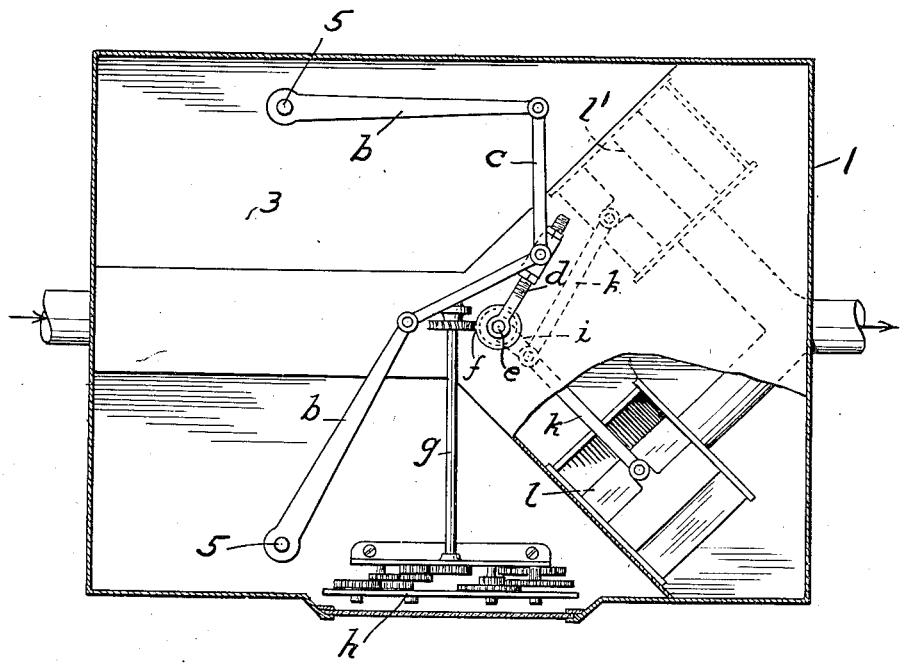
Figure 15 is a top or plan view of a meter with the superstructure or cover omitted.

Referring to the drawings, and more particularly to Figs. 1 to 4, 1 indicates one of the two chambers that are disposed on opposite sides of the partition 2 which divides the interior of the casing of a gas meter. 3 is the floor which separates these chambers from the upper part of the casting of the meter in which is arranged the registering or the registration mechanism and the valves and valve gear shown in Figure 15. 4 indicates the bellows which expand and contract as the gas to be measured passes both through and around them. There are means for guiding the movement of the bellows in a substantially fixed line path and they will now be described. 5 indicates the flag rod and it is supported in the meter housing so as to be turnable first in one direction and then in the other. The flag rod operates the registration mechanism and the valve gear. Loosely mounted for turning movement on the flag rod is the guide arm 6. The guide arm 6 is connected with the bellows plate 7 for turning movement, as shown by way of the bracket 8. The guide arm 6 constrains the bellows plate to move in a fixed path which, although arcuate, may by reason of its short length be regarded as straight. The fork 9, pivotally mounted in the meter housing and having sliding connection with the bellows plate 7, is an additional means for maintaining the movement of the bellows plate in a fixed path. The flag rod 5 is provided with a flag arm 10 affixed thereto and when this arm 10 is oscillated or turned through a definite angle the registration mechanism is actuated. Referring to Figure 15, the flag rods 5 are connected by arms $b$ and links $c$ with a crank-arm $d$ on a revolvable shaft $e$ so that, as the flag rods 5 are oscillated back-and-forth, the shaft $e$ is turned continuously in one direction. There is a worm and worm-wheel $f$ between the shaft $e$ and the shaft $g$. The shaft $g$ is geared to the registration mechanism $h$ and actuates the same. On the shaft *e* there is another crank-arm *i* and it is conencted by links *k* with the valves l and l' which are reciprocated back-and-forth. There are connections interposed between and directly connected with the bellows plate and the flag rod arm and they are constructed and arranged to afford the bellows plate range of travel in the described fixed path in excess of that required to turn the flag rod arm through the angle necessary for actuating the registration mechanism and valve gear. There are also means responsive to the physical condition of the gas passing through and around the bellows and operative to limit the excess travel of the bellows and they are interposed between the bellows plate 7 and the flag rod arm 10. The embodiment of these means and connections shown in Figs. 1 to 4 will now be described and in this case the means are responsive to gas temperature only. 11 is a U-shaped bi-metal thermostat having the end of one of its arms secured to the flag rod arm 10 and the other of its arms 12 disposed in the path of a pin 13 upstanding from bracket 8 secured to the bellows plate 7. The space *a* of variable dimensions between the end of the flag rod arm 10 and the end 12 of the arm of the thermostat, varies according to the temperature of the gas, and in doing so varies the degree of lag of movement of the registration mechanism in respect to the movement of the flag rod arm, and thus compensates the meter for change in the temperature of the gas. The space at *a*, in lateral direction along with the pin 13 constitutes a pin and slot mechanism which permits the pin and with it the bellows plate 7 to travel in its fixed path while the free end of the flag rod arm 10 oscillates in an arcuate path and this is true in all working positions of the arm 12. In this way friction and binding of the parts, such as would interfere with the accuracy of the meter as an instrument of precision, is avoided.

The construction and mode of operation of the modification shown in Figs. 5 to 7 are as above described except as follows: The end of the flag rod arm 10ᵃ is forked and one fork is provided with a pin 14. The bimetallic thermostat 15 is shown in the form of a spiral and its free end is connected with a cam 16 freely turnable on a pin 13ᵃ connected with the bellows plate 7. The working surface of the cam 16 is in line with the pin 14 so that the position of the cam 16 in respect to the pin 14 affords the variable space $a^1$ for lost motion between the turning movement of the flag rod arm and the reciprocating movement of the pin 13ᵃ in its fixed path.

The construction and mode of operation of the modification shown in Figure 8 are as above described except as follows: The flag rod arm 10ᵇ is provided with two pins 13ᵇ and 13ᶜ. There are two cams 16ᵃ and 16ᵇ concentrically pivoted by means of sleeved shafts and interposed between the pins 13ᵇ and 13ᶜ. One cam 16ᵃ is positioned by the spiralled thermostat 15ᵃ and the other 16ᵇ by a "Sylphon" bellows 17 responsive to gas pressure. In this construction the space indicated at $a^2$ provides the slot element of the slot and pin connection.

Figure 9:
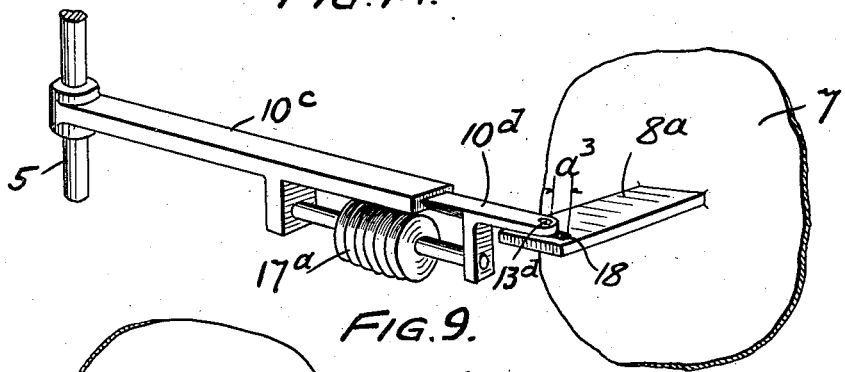
Figures 9 and 10 are perspective views respectively illustrating other modifications of the invention.

The construction and mode of operation of the modification shown in Fig. 9 are as above described except that the flag rod arm 10ᶜ is made in two pieces slidably connected with a "Sylphon" bellows 17ᵃ interposed between them. Between the part 10ᵈ and the bracket 8ᵃ on the bellows plate 7 is interposed the slot and pin mechanism 18 and 13ᵈ which affords the requisite space at $a^3$ for permitting of the described movements of the bellows plate in its fixed path and the oscillation in its arcuate path of the end of the flag rod arm. In this modification it is the change in radius between the pin 13ᵈ and the axis of the rod 5 that affords the necessary change in travel of the bellows plate and that radius is controled by the "Sylphon" bellows 17ᵃ.

Figure 2:
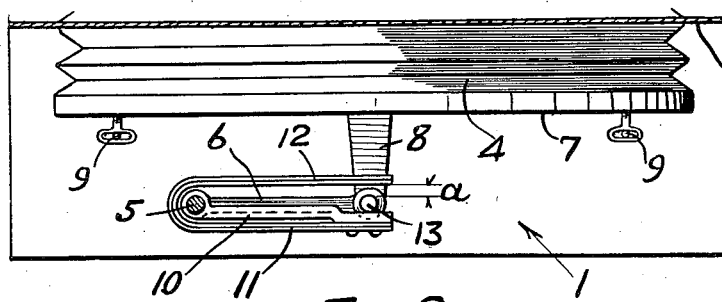
Figure 2 is a top or plan view of Figure 1 with parts removed.
Figure 4:
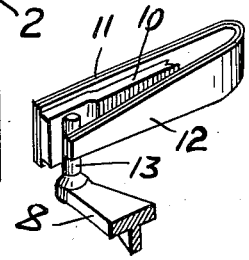
Figure 4 is a perspective view as seen from the upper right hand corner of Fig. 2 illustrative of features of the invention.
Figures 1, 3:
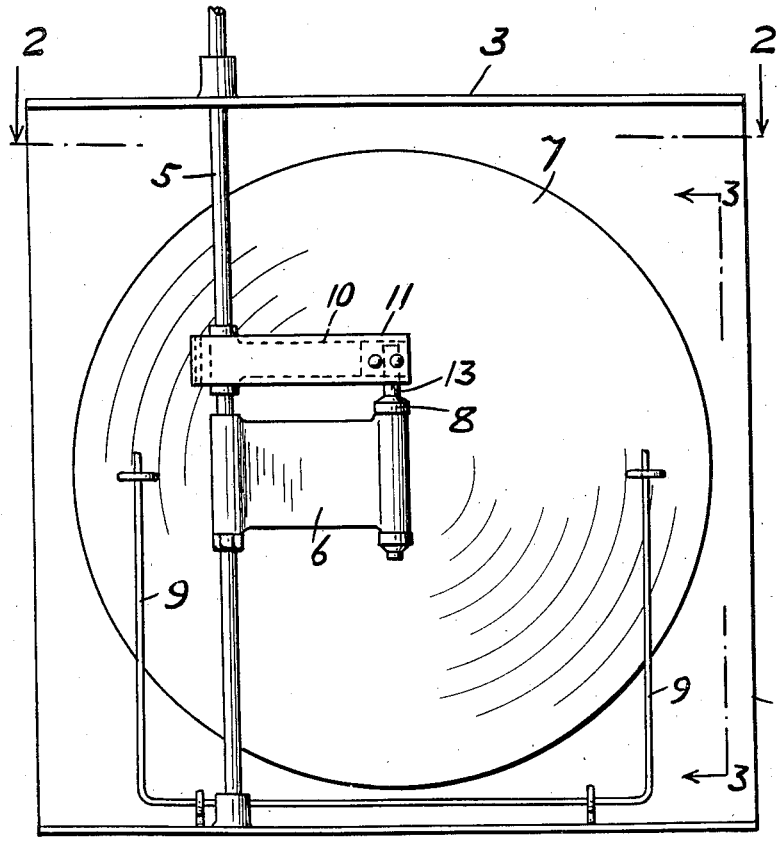
Figure 3 is a side view with parts removed.
Figure 10:
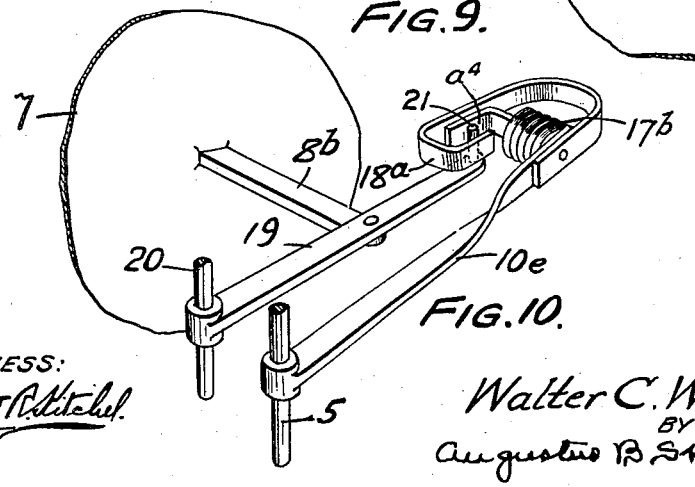

The construction and mode of operation of the modification shown in Figure 10 are as above described and are very much the same as in Figure 8. In this case the flag rod arm 10ᵉ is provided with a pressure-responsive "Sylphon" bellows 17ᵇ and with a thermostat loop 18ᵃ. The arm 19 which is pivoted to the bracket 8ᵇ on the bellows plate 7 is mounted on a turnable rod 20 journaled in bearings in plate 3 and the bottom of the meter casing as seen in Fig. 1 and the end of the rod 19, or more accurately a pin at the end of the arm 19, lies between the effective end of the thermostat 18ᵃ and of the bellows 17ᵇ. The space $a^4$ provides the slot, and the pin 21 provides the pin for the slot and pin mechanism. The space $a^4$ is variable in response to both pressure and temperature of the gas.

Figure 11:
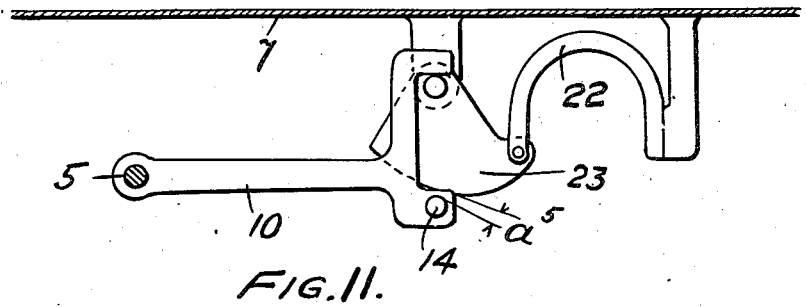

The construction and mode of operation shown in Figure 11 are as above described and in detail are substantially the same as in Figure 6 except as follows: The spiral thermostat of Figure 6 is replaced by the element 22 which is responsive to the physical condition of the gas (pressure or temperature or both) and turns the cam 23 so as to provide varying distance or space as at $a^5$. This space and the pin 14 constitute the elements of the slot and pin mechanism.

Figure 12:
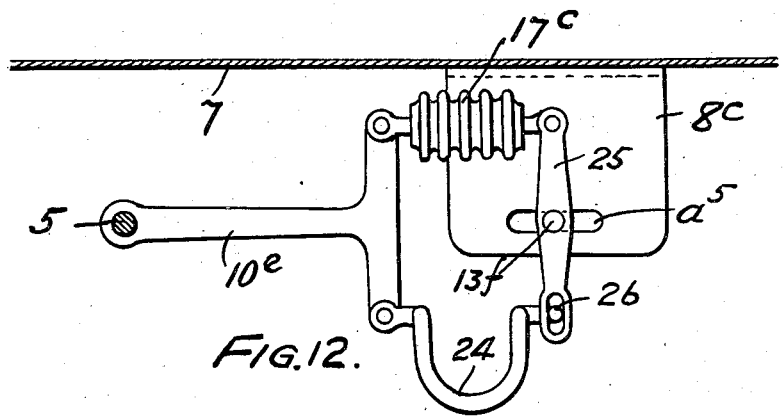

The construction and mode of operation of the modification shown in Figure 12 are as above described except as follows: The flag rod arm 10ᵉ is T-shaped and has pivotally connected at the ends of its head a "Sylphon" bellows 17ᶜ and a temperature responsive element 24. 25 is a floating link pivoted at one end to 17ᶜ and at the other end connected by a slot and pin connection 26 with the element 24. Between the link 25 and the bracket 8ᶜ there is a slot and pin connection. In this modification the change in length of the "Sylphon" bellows 17ᶜ and the element 24 operate to change the radius of the path of the pin 13ᶠ in respect to the axis of the flag rod arm thus changing the distance traveled by the bellows plate 7. The space at $a^5$ and the pin 13ᶠ provide the elements of the slot and pin mechanism.

Figure 13:
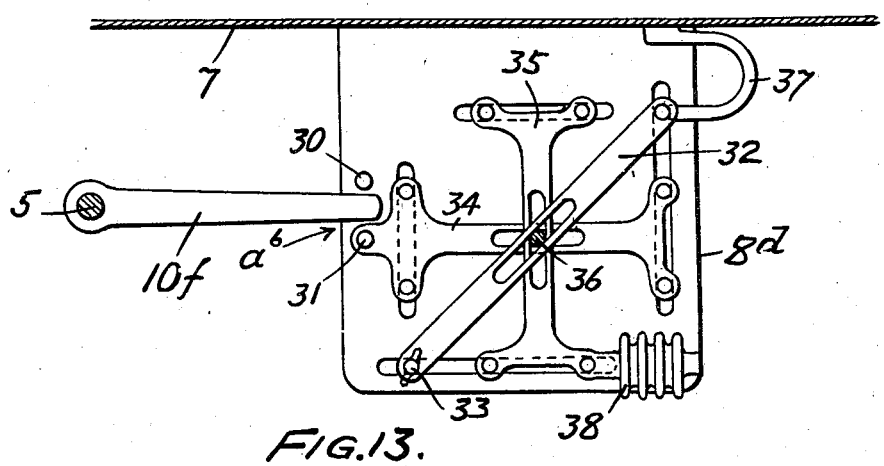

The construction and mode of operation of the modification shown in Figure 13 are as above described except as follows: The flag rod 10ᶠ is actuated between the pins 30 and 31 and the space at $a^6$ provides the slot of the slot and pin mechanism. There is a bar 32 slotted at its center and adjustably pivoted at 33. There are two carriages 34 and 35 slidable in directions at right angles to each other in respect to slots formed in the bracket 8ᵈ. The carriage 34 carries the pin 31. Each of these carriages is centrally slotted and in the slots is a connection 36 which also connects with the bar 32. The temperature responsive element 37 is connected with the end of the bar 32 and the "Sylphon" bellows 38 is connected with the carriage 35. The operation of the device is such that the elements 37 and 38 acting through the described linkage change the space at $a^6$.

Figure 14:
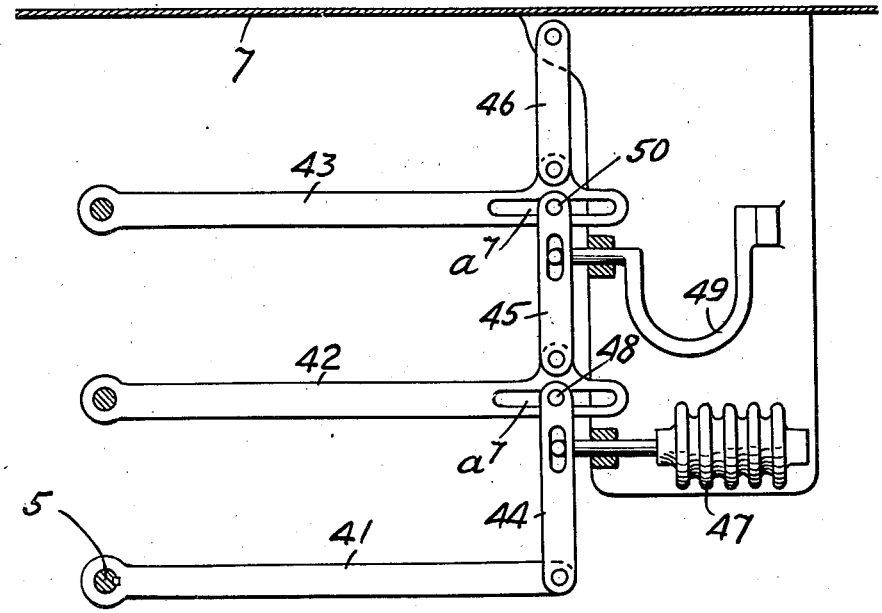
Figures 11, 12, 13 and 14 are diagrammatic plan views illustrating respectively other modifications of the invention.

The construction and mode of operation of the modification shown in Figure 14 are as above described except as follows: In this modification the flag rod 5 is connected to the bellows plate 7 by pivotal arms 41, 42 and 43, and links 44, 45 and 46. The link 44 is connected with a "Sylphon" bellows 47 through a slot and pin connection and the link 44 is connected with the arm 42 through a slot and pin connection 48. The link 45 is connected through a slot and pin connection with the temperature responsive element 49. The link 45 is connected with the arm 43 through a slot and pin connection 50. Evidently the elements 47 and 49 operate to lengthen or shorten the connection between the arm 41 and the bellows plate 7, thus changing the throw of the arm 41 in respect to the travel of the bellows plate. In this way the movements of the flag rod 5 and parts connected therewith may lag in respect to the movements of the bellows plate. The space at $a^7$ and the pins 48 and 50 provide the elements of the slot and pin mechanism.

It may be remarked that in some of the modifications the slot and pin mechanism by reason of the space indicated at $a$ affords lost motion in the direction of the travel of the bellows plate and that in other modifications it affords lost motion in a direction generally parallel to the bellows plate and in others of the modifications it affords lost motion in both of these directins. In every case it permits the bellows plate to freely follow a fixed path and the free end of the flag rod arm to oscillate freely in a curved path of constant amplitude. In some cases it performs the additional function of permitting the bellows plate to move a short distance in its fixed path after the completion of the oscillation of the flag rod arm. By pin-and-slot connection or mechanism is meant a device including a small and narrow opening receiving another part of a mechanism movable in respect to the wall which defines the opening either in the direction of the wall which defines the ends of the openings or crosswise thereof. In Figure 8 the slot or opening is indicated at $a^2$ and the surfaces of elements $16^a$ and $16^b$ are the parts of the mechanism that work with lost motion between them. In Figure 11 the slot or opening is indicated at $a^5$ and the pin element is the part 23. In Figure 13 the slot or opening is defined by the pins 30 and 31 and the pin element is $10^f$. The change throw mechanism by which the bellows plate is permitted to travel a short distance further than is necessary for turning the flag rod arm through the angle appropriate for actuating the registering and valve mechanism, assumes two forms; first, a pin and slot connection (Figs. 1, 8, 10, 11 and 13), and second, provisions by which the point of attachment of the bellows plate to the flag rod arm can be shifted further from and nearer to the axis of the flag rod, thus moving the point of attachment along one of the lines that bounds the angle of oscillation of the flag rod arm in respect to the point of the angle, thereby changing the resultant travel of that point in respect to the central partition sufficiently to accomplish the object stated (Figs. 9, 12 and 14). In one case the element responsive to the physical condition of the gas—temperature and pressure—determines the extent of space provided for the travel of the pin, and in the other case that element determines the extent of shifting of the point of attachment.

It may be remarked that during the short movement of the bellows plate while the flag rod dwells, the bellows expand to accommodate the volume of gas necessary to compensate for changes in specific volume so that the total integration will be a measure of weight. It must be understood that there is a dwell in the flag rod movement during the collapse of the bellows corresponding to the dwell in the inflation of the bellows and during that dwell the enclosed space external to the bellows increases in capacity to accommodate the compensating volume of gas which passes through the meter without entering the bellows.

A standard meter registers volume of gas and is proportioned to measure energy content only under standard conditions which are roughly average. In a meter embodying features of the invention the condition of zero lost motion, in which the action is identical with that of a standard meter, is that for the minimum gas temperature and highest gas pressure to be expected. Consequently, for the gas condition at which the standard meter reads accurately in terms of heat content the improved meter gives the same registration but operates with a definite degree of lost motion.

It will be obvious to those skilled in the art to which the invention relates that modifications may be made in details of construction and arrangement and matters of mere form without departing from the spirit of the invention which is not limited to such matters or otherwise than the appended claims may require.

I claim:

1. In a gas meter the combination of bellows which expand and contract as the gas to be measured passes both through and around them, means for guiding the movement of the bellows in a substantially fixed path, rotary registration mechanism constructed and arranged to register the cycles of bellows movement, a flag rod having means adapted to actuate the registration mechanism and provided with a radially disposed arm immovably fixed thereto which when oscillated through a definite angle and in a circular path actuates the registration mechanism, connections interposed between the bellows and the flag rod arm and constructed and arranged to afford the bellows a range of the fixed path travel in excess of that required to turn the arm through the angle of definite value, means in direct contact with the gas being measured and responsive to the physical condition of the gas passing through and around the bellows and operative to limit the excess travel of the bellows and interposed between the bellows and the oscillating arm, and a pin and slot mechanism interposed in said connections and between the bellows and the arm and constructed and arranged to afford freedom of substantial fixed path movement of the bellows and freedom of oscillating movement in a circular path of the arm at all adjustments of the travel of the bellows.

2. The combination in a gas meter of a gas tight housing having a center partition and through which housing and the bellows flows the gas to be metered, at least one bellows applied to one face of the partition and having a bellows plate adapted to move a short distance of varying length in addition to the strokes necessary to actuate a valve and registering mechanism in respect to the center partition to provide varying capacity both inside and outside the bellows, registering and valve mechanism in which there is a dwell during a short distance movement of the bellows plate necessary to accommodate the volume of gas required to compensate for changes in specific volume, an upright flag rod arranged outside of the bellows and turnably mounted within the housing and adapted to actuate said valve and registering mechanism, a flag rod arm constructed and arranged to turn the flag rod through a definite angle, and variable throw mechanism in direct contact with the gas being measured and responsive to the physical condition of the gas and directly connected with the flag rod arm and interposed between the bellows plate and the free end of the flag rod arm and constructed and arranged to provide the dwell in the movement of the flag rod arm and in the valve and registering mechanism operated thereby while the bellows plate completes the short distance movement.

3. In a standard gas meter of the type recited having an upright flag rod and flag arm immovably fixed thereto which are constructed and arranged to oscillate through a definite angle and a bellows having a bellows plate constructed to normally make strokes of fixed length, the improvement which consists in a lost motion mechanism arranged outside the bellows and between the bellows plate and the free end of the flag rod arm and in contact with the gas being measured and responsive to the physical condition of the gas and adapted to afford the bellows plate a range of travel while the angle of oscillation of the flag rod arm remains constant.

4. In a standard gas meter having a register and a bellows free to make strokes of normal length and to over and under run such strokes, means for compensating for variations in the condition of the gas being metered, said means being located at the bellows and comprising in combination, a linkage connecting said bellows to said register so that said bellows makes strokes varying in length in accordance with the amount of gas passing around and through said bellows, said linkage permitting over and under strokes of the bellows in respect to normal strokes thereof without correspondingly operating the register and including as parts thereof, first slot-and-pin means acting to vary the amount said register is driven by said bellows at certain lengths of strokes thereof, said first slot-and-pin means comprising, a pin mounted for reciprocating movement and a pair of members mounted on either side of said pin in the path of movement thereof and arranged for movement in contact with said pin to actuate said register and to permit lost motion between said pin and said members without contact therebetween at the beginning of each stroke of said bellows and without actuating said register, and second means responsive to a change of condition of the gas being metered and located in the gas being metered and outside of said bellows and arranged to adjust said first slot-and-pin means in proportion to the change in stroke of said bellows whereby said register is moved the same amount despite a different amount of movement of said bellows.

WALTER C. WAGNER.